(12) United States Patent
Kim

(10) Patent No.: US 9,056,653 B2
(45) Date of Patent: Jun. 16, 2015

(54) HAND-FOOT COMPOUND BICYCLE WITH DOUBLE RATCHET

(71) Applicants: INDUSTRY-ACADEMIC COOPERATION FOUNDATION, HANSEO UNIVERSITY, Seosan-si, Chungcheongnam-do (KR); Hak Yoon Kim, Goyang-si, Gyeonggi-do (KR)

(72) Inventor: Hak Yoon Kim, Goyang-si (KR)

(73) Assignees: INDUSTRY-ACADEMIC COOPERATION FOUNDATION, HANSEO UNIVERSITY, Chungcheongnam-Do (KR); Hak Yoon Kim, Gyeonggi-Do (KR)

( * ) Notice: Subject to any disclaimer, the term of this patent is extended or adjusted under 35 U.S.C. 154(b) by 0 days.

(21) Appl. No.: 14/106,861

(22) Filed: Dec. 16, 2013

(65) Prior Publication Data

US 2015/0108734 A1    Apr. 23, 2015

(30) Foreign Application Priority Data

Oct. 22, 2013   (KR) .......................... 10-2013-0126209

(51) Int. Cl.
*B62M 1/12*    (2006.01)
*B62M 17/00*   (2006.01)

(52) U.S. Cl.
CPC ........ *B62M 1/12* (2013.01); *B62M 17/00* (2013.01)

(58) Field of Classification Search
CPC ................................ B62M 1/12; B62M 17/00
USPC .............................................. 280/233, 242.1
See application file for complete search history.

(56) References Cited

U.S. PATENT DOCUMENTS

| 528,423 | A | * | 10/1894 | Ferguson | 280/234 |
| 690,180 | A | * | 12/1901 | Pierson | 280/234 |
| 3,910,599 | A | * | 10/1975 | Thomas | 280/234 |
| 4,270,766 | A | * | 6/1981 | Thomas | 280/234 |
| 4,417,742 | A | * | 11/1983 | Intengan | 280/234 |
| 4,685,692 | A | * | 8/1987 | Fullilove et al. | 280/234 |
| 5,429,379 | A | * | 7/1995 | Grigoriev | 280/233 |
| 5,785,336 | A | * | 7/1998 | Jang | 280/234 |
| 6,032,969 | A | * | 3/2000 | Kurgan et al. | 280/233 |
| 7,896,375 | B2 | * | 3/2011 | Cynn | 280/234 |
| 8,403,349 | B2 | * | 3/2013 | Pi | 280/234 |
| 8,876,135 | B2 | * | 11/2014 | Kim | 280/234 |
| 2012/0104723 | A1 | * | 5/2012 | Kim | 280/233 |

FOREIGN PATENT DOCUMENTS

KR   10-2005-0113119 A   12/2005
KR       10-0955892 B1    5/2010

* cited by examiner

*Primary Examiner* — Joseph Rocca
*Assistant Examiner* — Michael Stabley
(74) *Attorney, Agent, or Firm* — Revolution IP, PLLC

(57) ABSTRACT

Disclosed is a hand-foot compound bicycle with a double ratchet, which comprises a handle assembly which comprises a crank handle for generating handle power, and an upper gear to be rotated by rotation of the crank handle; a pedal assembly which comprises a pedal for generating pedal power, and transfers both or either one of the handle power and the pedal power to a rear wheel; and a power transfer unit which comprises a first power transfer gear corresponding to the upper gear, and a second power transfer gear for transferring the handle power from the first power transfer gear to the pedal assembly.

10 Claims, 5 Drawing Sheets

HAND-FOOT COMPOUND BICYCLE WITH DOUBLE RATCHET

CROSS-REFERENCE TO RELATED APPLICATION

This application claims priority from Korean Patent Application No. 10-2013-0126209, filed on Oct. 22, 2013 in the Korean Intellectual Property Office, the disclosure of which is incorporated herein by reference.

BACKGROUND OF THE INVENTION (a) Field of the Invention

The present invention relates to a compound bicycle, and more particularly to a hand-foot compound bicycle with a double ratchet, in which handle power and pedal power are stably and efficiently transferred to a wheel.

(b) Description of the Related Art

In general, a bicycle allows a rider to press down a pedal with a foot and control a pose and direction with hands.

Therefore, in terms of exercise, a leg exercising effect is great but an arm exercising effect is marginal. Further, a running speed of a bicycle is restrictive.

Meanwhile, to solve such problems, there has been tried to improve a structure of a bicycle so that a rider can ride the bicycle while complexly using his/her hands and feet.

However, a conventionally proposed bicycle has problems that its structure is complicated, difference in speed a front wheel and a rear wheel brings inconvenience, and arms are unnaturally moved.

Further, pedals to be respectively pressed by arms and legs are interlocked with each other, and therefore a problem arises in that a pedal shaft at the handle operates to rotate even when the pedal is pressed by only the leg.

Also, when the handle is rotated by the arm to drive the bicycle, a steering shaft of the front wheel is affected by the rotation of the handle, thereby causing a trouble with steering.

Accordingly, there is a need of developing a bicycle that has a simple structure; is easily transformed from the existing bicycle; and is driven by both or either one of the arm and the leg as necessary.

Also, there is a need of developing a bicycle in which motions of a rider's arms and legs are very natural in light of a human body; a running speed as well as an exercising effect is enhanced; and it is funny.

Further, there is a need of developing a power transfer structure in which the steering shaft is not affected even when the handle is operated by the arms to drive the bicycle.

SUMMARY OF THE INVENTION

Accordingly, the present invention is conceived to solve the forgoing problems, and an aspect of the present invention is to provide a hand-foot compound bicycle with a double ratchet, in which handle power and pedal power can be stably and efficiently transferred to a wheel.

In accordance with an aspect of the present invention, there is provided a hand-foot compound bicycle with a double ratchet comprise a handle assembly which comprises a crank handle for generating handle power, and an upper gear to be rotated by rotation of the crank handle; a pedal assembly which comprises a pedal for generating pedal power, and transfers both or either one of the handle power and the pedal power to a rear wheel; and a power transfer unit which comprises a first power transfer gear corresponding to the upper gear, and a second power transfer gear for transferring the handle power from the first power transfer gear to the pedal assembly, the pedal assembly comprising: a frame hub, a lower gear placed inside the frame hub and rotating corresponding to the second power transfer gear, a first ratchet engaged with the lower gear and rotating, a spindle penetrating the lower gear and the first ratchet and rotating independently of the lower gear and the first ratchet, first and second pedal cranks coupled to opposite ends of the spindle, a second ratchet coupled to the spindle and rotating, a hub body coupled to both or either one of the first ratchet and the second ratchet while partially accommodating both the first ratchet and the second ratchet and rotating in one direction, and a chain ring coupled to the hub body and transmitting power to the rear wheel.

Here, the first ratchet comprises: a first ratchet body, and a first ratchet gear provided on an outer circumference of the first ratchet body, in which the first ratchet gear rotates the hub body in one direction while engaging with a gear engaging groove formed in the hub body when the lower gear rotates.

The pedal assembly may further comprise a connection bearing interposed between the first ratchet and the second ratchet and allowing the first ratchet and the second ratchet to rotate independently of each other.

Also, the pedal assembly may further comprise a first ratchet cover having a first end coupled to the hub body and a second end partially covering an outer surface of the first ratchet, and a second ratchet cover having a first end coupled to the hub body and a second end partially covering an outer surface of the second ratchet.

The pedal assembly may further comprise a first ball bearing interposed between the first ratchet cover and the first ratchet and allowing the first ratchet cover and the first ratchet to rotate independently of each other, and a second ball bearing interposed between the second ratchet cover and the second ratchet and allowing the second ratchet cover and the second ratchet to rotate independently of each other.

The pedal assembly may comprise an internal bearing interposed between an outer surface of the spindle and an inner surface of the lower gear and allowing the spindle and the lower gear to rotate independently of each other, and an external bearing interposed between an outer surface of the lower gear and an inner surface of the first ratchet cover and allowing the first ratchet cover and the lower gear to rotate independently of each other.

The frame hub may comprise a first connecting portion coupling with a lower frame in which a lower region of the power transfer unit is provided, a second connecting portion coupling with a middle frame connected to a saddle, a first extended portion extended toward the first ratchet, and a second extended portion extended in an opposite direction to the first extended portion.

Also, the pedal assembly may further comprise a first lower bracket cup inserted in and coupled to an inner surface of the first extended portion while being spaced at a certain distance from an outer surface of the first ratchet cover, and a second lower bracket cup inserted in and coupled to an inner surface of the second extended portion.

Also, the pedal assembly may further comprise a first cover bearing interposed between an outer surface of the first ratchet cover and an inner surface of the first lower bracket cup so that the first ratchet cover can freely rotate with respect to the first lower bracket cup, and a second cover bearing interposed between an outer surface of the spindle and an inner surface of the second lower bracket cup so that the spindle can freely rotate with respect to the second lower bracket cup.

Also, the pedal assembly may further comprise a cover nut coupled to the first end of the first ratchet cover and preventing the first cover bearing from separating from the outer surface of the first ratchet cover.

Also, the second ratchet may comprise a second ratchet body, and a second ratchet gear provided on an outer circumference of the second ratchet body, in which the second ratchet gear rotates the hub body in one direction while engaging with the gear engaging groove when the spindle rotates.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Below, exemplary embodiments according to the present invention will be described in detail with reference to accompanying drawings.

Figure 1:
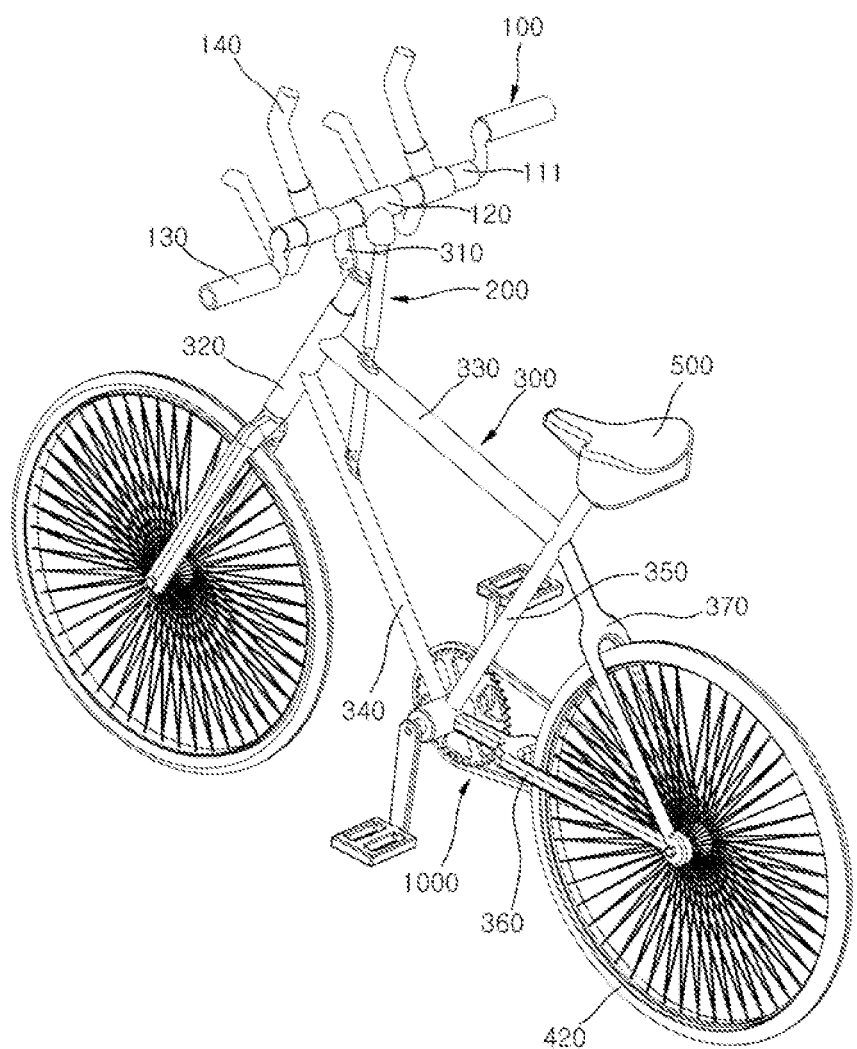
FIG. 1 is a perspective view of a hand-foot compound bicycle according to an embodiment of the present invention.
Figure 2:
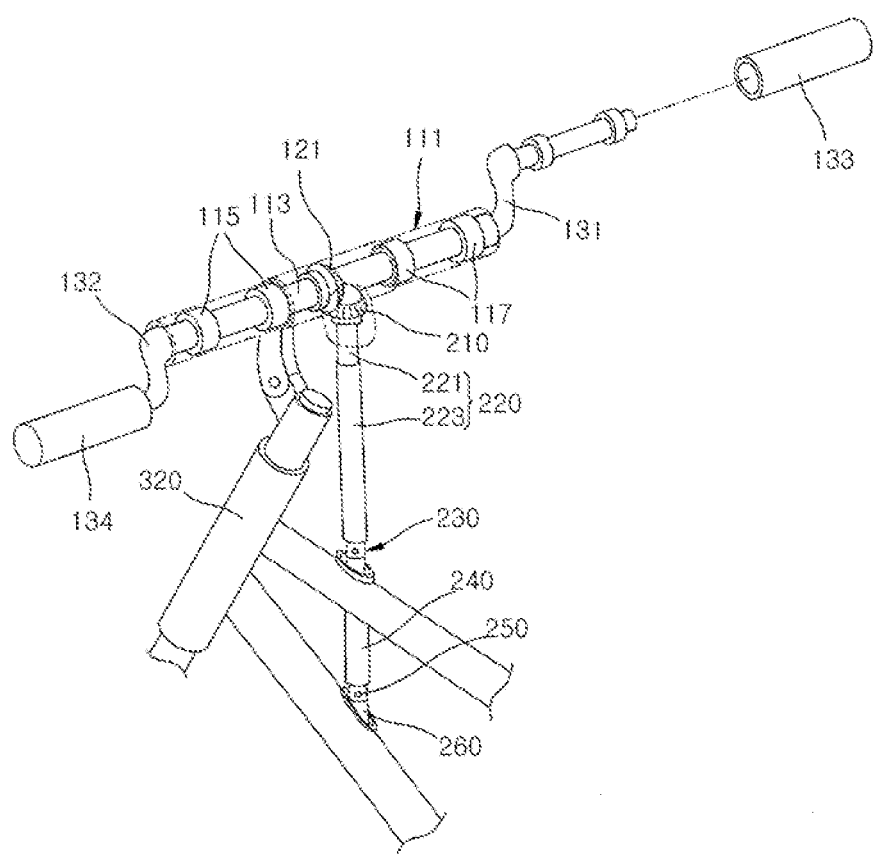
FIG. 2 is a view showing connection between a handle assembly and a power transfer unit in the hand-foot compound bicycle of FIG. 1.
Figure 3:
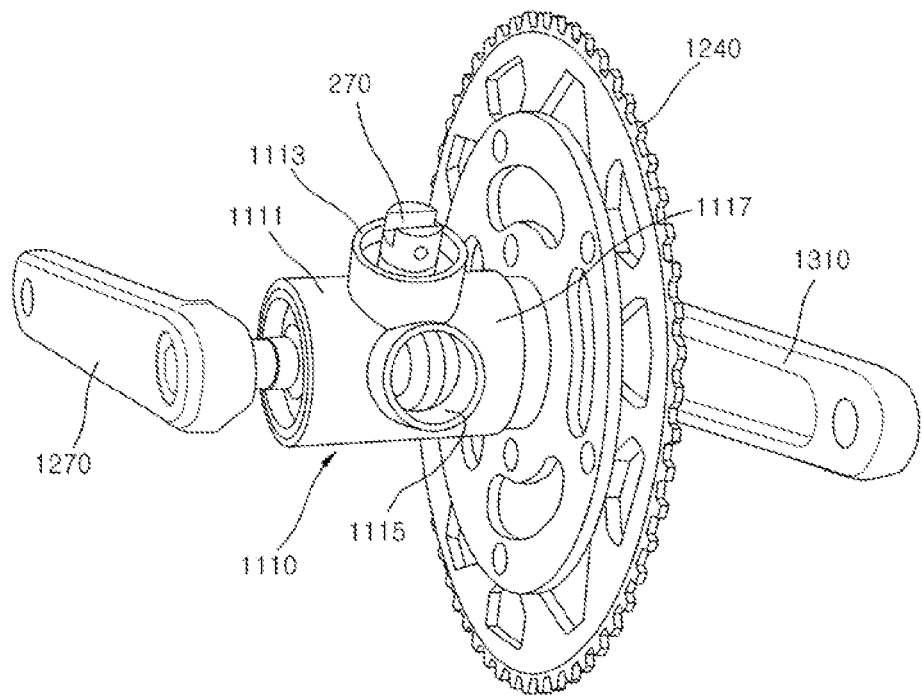
FIG. 3 is a perspective view showing a pedal assembly in the hand-foot compound bicycle of FIG. 1.
Figure 4:
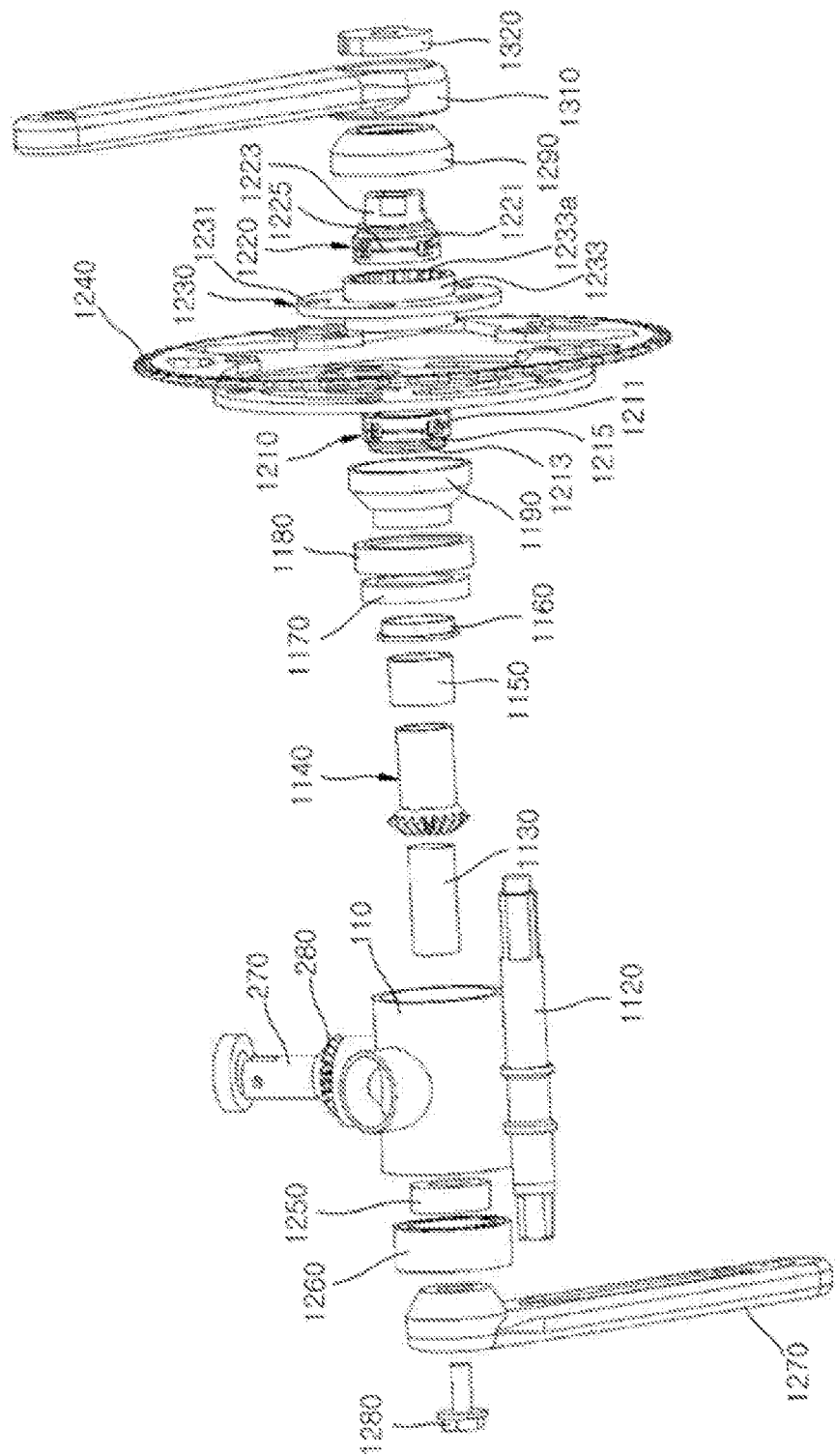
FIG. 4 is an exploded perspective view of the pedal assembly of FIG. 3.
Figure 5:
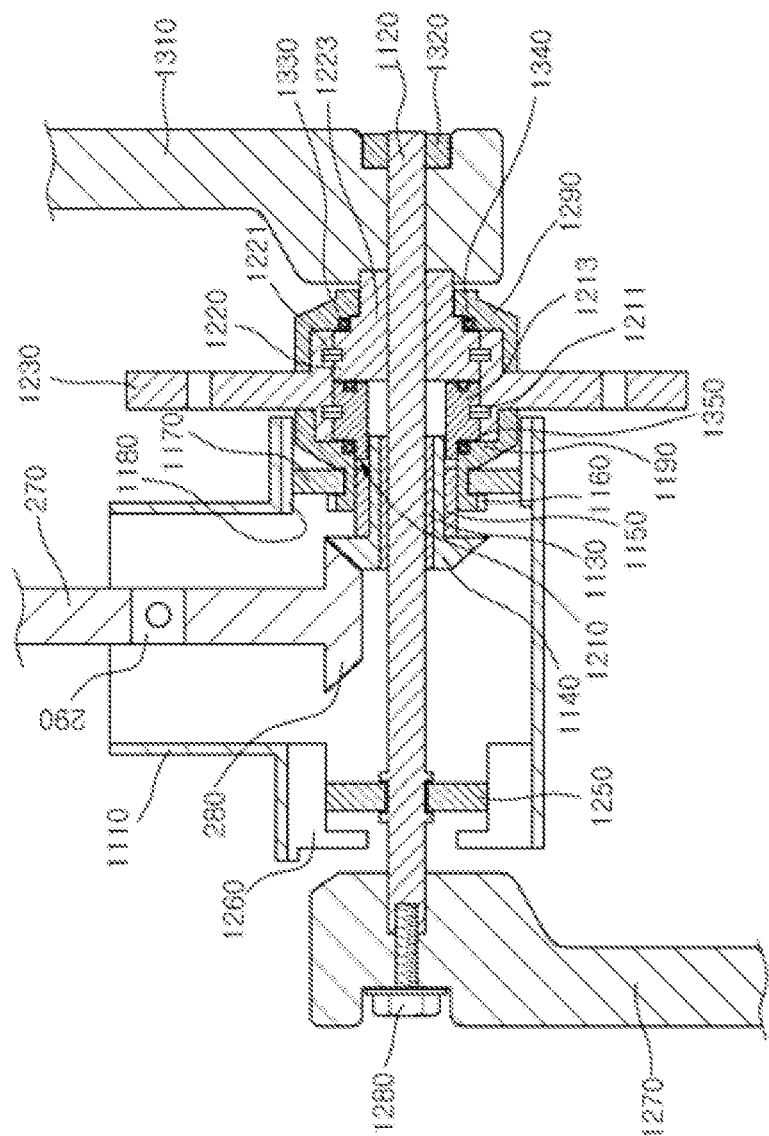
FIG. 5 is a partial cross-section view of the pedal assembly of FIG. 3.

Referring to FIGS. 1 to 5, a hand-foot compound bicycle in this exemplary embodiment includes a handle assembly 100, a pedal assembly 1000, a bicycle frame unit 300 and a power transfer unit 200.

In detail, the handle assembly 100 includes a crank handle 130, a handle stem 111, a handle hub 120, a handle shaft 113, a left bearing 115, a right bearing 117, an upper gear 121 and a brake unit 140.

The crank handle 130 is to generate handle power, which includes a left crank shaft 132 and a right crank shaft 131, and a left crank handle cover 134 and a right crank handle cover 133 at opposite ends thereof, respectively.

A middle of the handle stem 111 is externally provided with the handle hub 120 for connection with the power transfer unit 200, and an outer surface of the handle stem 111 is provided with the brake unit 140 inclined upward with respect to the handle hub 120.

Both sides of the handle shaft 113 are respectively coupled with the left crank shaft 132 and the right crank shaft 131, and an upper gear 121 is fitted to an outer surface in the middle of the handle shaft 113.

Also, the left bearing 115 and the right bearing 117 are put on the outer surface of the handle shaft 113 at opposite sides with respect to the upper gear 121.

Also, the handle shaft 113 is arranged to penetrate the handle stem 111, in which the left bearing 115 and the right bearing 117 are interposed between the handle shaft 113 and the handle stem 111 so that the handle shaft 113 can rotate with respect to the stationary handle stem 111.

Consequently, when a rider grips and rotates the crank handle 130, the handle shaft 113 coupled to the crank handle 130 is rotated and thus the upper gear 121 is rotated as the handle shaft 113 is rotated. That is, the rotation of the crank handle 130 causes the upper gear 121 to rotate.

The torque of the upper gear 121 is transferred to the pedal assembly 1000 via the power transfer unit 200.

Meanwhile, the power transfer unit 200 includes a first power transfer gear 210, a first universal joint (not shown), a first power transfer member 220, a second universal joint 230, a second power transfer member 240, a third universal joint 250, a third power transfer member 260, member 260, a fourth universal joint 290, a fourth power transfer member 270 and a second power transfer gear 280.

The first power transfer gear 210 rotates meshing with the upper gear 121. Here, the upper gear 121 and the first power transfer gear 210 may employ bevel gears which have a gear ratio of 1:1 and rotating axes perpendicular to each other.

The first power transfer gear 210 rotates meshing with the upper gear 121, and the torque of the first power transfer gear 210 is transferred to the second power transfer gear 280 via the first universal joint, the first power transfer member 220, the second universal joint 230, the second power transfer member 240, the third universal joint 250, the third power transfer member 260, the fourth universal joint 290 and the fourth power transfer member 270.

The first power transfer member 220 includes an inner spline 221 and an outer spline 223.

Also, the inner spline 221 is coupled to the first universal joint, and the outer spline 223 rotates sliding on the inner spline 221.

The second universal joint 230 has a first side coupled to the outer spline 223 and a second side coupled to the second power transfer member 240.

Here, a guide projection (not shown) is formed on an outer circumference of the inner spline 221, and a projection-accommodating groove (not shown) is formed on an inner circumference of the outer spline 223 and engaged with the guide projection, so that the inner spline 221 and the outer spline 223 can be rotated together and straightly move sliding on each other.

Also, the first power transfer gear 210 and the second power transfer gear 280 may employ bevel gears having a gear ratio of 1:1.

In result, handle power generated in the crank handle 130 is transferred to the pedal assembly 1000 via the upper gear 121, the first power transfer gear 210 and the second power transfer gear 280.

Meanwhile, a bicycle frame unit 300 includes an upper frame 330, a lower frame 340, a steering frame 320, a connection frame 310, a middle frame 350, a chain connection lower frame 360 and a chain connection upper frame 370.

The steering frame 320 is internally provided with a steering shaft, and the steering shaft is connected to the handle stem 111 through the connection frame.

Also, the steering frame 320 is connected to a frame hub 1110 of the pedal assembly by the lower frame 340.

The lower frame 340 is internally provided with a lower region of the power transfer unit 200, e.g., with the fourth power transfer member 270.

The middle frame 350 has a first end connected to a saddle 500, and a second end connected to the pedal assembly 1000, i.e., to the frame hub.

The middle frame 350 and the steering frame 320 are connected by the upper frame 330, and the upper frame 330 is formed with a through hole (not shown) through which the power transfer unit 200 passes.

Also, the frame hub 1110 is connected to a wheel hub of a rear wheel by the chain connection lower frame 360, and the middle frame 350 is connected to the wheel hub of the rear wheel by the chain connection upper frame 370.

Meanwhile, the pedal assembly 1000 includes a frame hub 1110, a lower gear 1140, a first ratchet 1210, a second ratchet 1220, a spindle 1120, a first pedal crank 1270, a second pedal crank 1310, a pedal 1360, a hub body 1230, a chain ring 1240, a connection bearing 1340, a first ratchet cover 1190, a second ratchet cover 1290, a first ball bearing 1350, a second ball bearing 1330, a internal bearing 1130, a external bearing 1150, a first lower bracket cup 1180, a second lower bracket cup 1260, a first cover bearing 1170, a second cover bearing 1250, a cover nut 1160, a coupling bolt 1280 and a cap nut 1320.

Throughout this specification, the double ratchet refers to the first ratchet 1210 and the second ratchet 1220 which are driven independently of each other.

The frame hub 1110 includes a first connecting portion 1113 coupled to the lower frame 340, a second connecting portion 1115 coupled to the middle frame 350, a first extended portion 1117 extended toward the first ratchet 1210, and a second extended portion 1111 extended in an opposite direction to the first extended portion 1117.

The second power transfer gear 280, the lower gear 1140, a portion of the first ratchet 1210, a portion of the spindle 1120, the first ratchet cover 1190, the first ball bearing 1350, the internal bearing 1130, the external bearing 1150, the first lower bracket cup 1180, the second lower bracket cup 1260, the first cover bearing 1170, the second cover bearing 1250 and the cover nut 1160 are efficiently arranged inside the frame hub 1110 so as to transfer power through a stable structure.

Specifically, inside the frame hub 1110, the lower gear 1140 meshes with the second power transfer gear 280 and receives torque, i.e., the handle power. Here, the lower gear 1140 may employ a bevel gear, and a gear ratio between the lower gear 1140 and the second power transfer gear may be 1:1.

The lower gear 1140 is screw-coupled to the first ratchet 1210 and transfers the handle power to the first ratchet 1210, so that the first ratchet 1210 can rotate the hub body 1230.

The hub body 1230 is coupled to the chain ring 1240, and the torque of the hub body 1230 is transferred to the rear wheel 420 via the chain ring 1240. Here, the chain ring 1240 includes a spider.

Meanwhile, the first end of the first ratchet 1210 is selectively coupled to the hub body 1230 as being accommodated in the hub body 1230, thereby rotating the hub body 1230 in one direction, i.e., a direction in which the rear wheel rotates.

Here, the lower gear 1140 and the first ratchet 1210 have hollows, so that the spindle 1120 can penetrate the lower gear 1140 and the first ratchet 1210.

The internal bearing 1130 is interposed between the outer surface of the spindle 1120 and the inner surface of the lower gear 1140 so that the spindle 1120 and the lower gear 1140 can rotate independently of each other.

While accommodating respective portions of the first ratchet 1210 and second ratchet 1220, the hub body 1230 is coupled to both or either one of the first ratchet 1210 and the second ratchet 1220 and rotates in one direction.

Specifically, the hub body 1230 includes a hollow ratchet accommodating portion 1233 partially accommodating the first ratchet 1210 and second ratchet 1220, and a hub body flange 1231 extended in a radial direction of the ratchet accommodating portion 1233 and coupled to the chain ring 1240.

On the inner circumference of the ratchet accommodating portion 1233, a gear engaging groove 1233a Is formed and selectively coupled to a first ratchet gear 1211 of the first ratchet or a second ratchet gear 1221 of the second ratchet.

The gear engaging groove 1233a has a saw-toothed cross-section inclined in one direction. That is, only when the first ratchet 1210 and the second ratchet 1220 are respectively rotated, the first ratchet gear 1211 and the second ratchet gear 1221 are coupled to the gear engaging groove 1233a, thereby rotating the hub body 1230.

The first ratchet 1210 includes a first ratchet body 1213, a first ratchet gear 1211 arranged on the outer circumference of the first ratchet body 1213, and a first spring 1215 elastically restoring the first ratchet gear 1211.

Specifically, first ratchet gear accommodating grooves (not shown) for accommodating the first ratchet gear 1211 are formed at regular intervals on the outer circumference of the first ratchet body 1213, and a first spring accommodating groove (not shown) for accommodating the first spring 1215 holding the first ratchet gear is formed on the outer circumference of the first ratchet body 1213.

The first ratchet gear 1211 includes a lower body (not shown) and an upper body (not shown) extended from the lower body, and a first ratchet gear accommodating groove includes a lower body accommodating groove (not shown) for accommodating the lower body and an upper body accommodating groove for accommodating the upper body.

The first spring 1215 continuously pulls the lower body so that the lower body of the first ratchet gear 1211 can be stably seated on the lower body accommodating groove and the upper body can protrude from the outer circumference of the first ratchet body 1213 and maintain an erect posture.

At this time, if an external force presses the upper body, the upper body is seated on the upper body accommodating groove and thus the first ratchet gear 1211 does not protrude out from the outer circumference of the first ratchet body 1213.

In result, when the first ratchet 1210 rotates, the first ratchet gear 1211 is coupled to the gear engaging groove 1233a and rotates the hub body 1230 in one direction.

On the other hand, if the hub body 1230 is rotated by an external force, the hub body 1230 presses the upper body and thus the first ratchet gear 1211 is accommodated in the first ratchet gear accommodating groove, thereby causing sliding between the first ratchet 1210 and the hub body 1230. That is, while the first ratchet 1210 is maintained stationary, only the hub body 1230 rotates sliding on the outer circumference of the first ratchet 1210.

Meanwhile, the second ratchet 1220 includes a second ratchet body 1223, the second ratchet gear 1221 arranged on the outer circumference of the second ratchet body 1223, and a second spring 1225 elastically restoring the second ratchet gear 1221.

A structure where the second ratchet 1220 is selectively coupled to the hub body 1230 is substantially equivalent to the foregoing structure where the first ratchet 1210 is selectively coupled to the hub body 1230.

However, the second ratchet 1220 includes a first end coupled to the spindle 1120 and a second end coupled to the second pedal crank 1310.

Specifically, the second ratchet body 1223 is formed with a rectangular through hole, through which the spindle 1120 passes, along an axial direction of the spindle 1120. One end of the second ratchet body 1223 is coupled to the second pedal crank 1310 as being inserted in an insertion groove (not shown) formed in the second pedal crank 1310.

Consequently, when the hub body 1230 is rotated by the first ratchet 1210, the second ratchet 1220 is maintained stationary. On the other hand, when the hub body 1230 is rotated by the second ratchet 1220, the first ratchet 1210 is maintained stationary.

Of course, if both the crank handle 130 and the pedal crank are rotated, the first ratchet 1210, the second ratchet 1220 and the hub body 1230 are rotated simultaneously.

Also, the connection bearing 1340 is interposed between the first ratchet 1210 and the second ratchet 1220 so that the first ratchet 1210 and the second ratchet 1220 can be rotated independently of each other.

The first ratchet 1210 and the second ratchet 1220 are formed with bearing grooves (not shown) to receive the connection bearing 1340 on the surfaces thereof facing each other in which a diameter of the bearing groove is 1.02 times larger than that of the connection bearing 1340.

Meanwhile, the first ratchet cover 1190 has a first end coupled to the hub body 1230 and a second end covering the outside of the first ratchet 1210.

Specifically, the first ratchet cover 1190 has the first end coupled to a partial outer surface of the left ratchet accommodating portion 1233 extended toward the first ratchet 1210, and the second end covering an outside of a remaining portion of the first ratchet not accommodated in the ratchet accommodating portion 1233.

The first ball bearing 1350 is provided between the inner surface of the first ratchet cover 1190 and the outer surface of the other portion, i.e., the outer surface of the first ratchet 1210 not accommodated in the ratchet accommodating portion.

The first ball bearing 1350 serves to allow the first ratchet cover 1190 and the first ratchet 1210 to rotate independently of each other.

Since the first ratchet cover 1190 is coupled to the ratchet accommodating portion 1233, i.e., the hub body, the first ratchet cover 1190 rotates when the hub body 1230 rotates.

Here, when the hub body 1230 is rotated by an external force, the first ratchet cover 1190 rotates, whereas the first ratchet is maintained stationary due to the presence of the first ball bearing 1350.

Also, the external bearing 1150 is provided between the external surface of the lower gear 1140 and the inner surface of the first ratchet cover 1190 so that the first ratchet cover 1190 and the lower gear 1140 can rotate independently of each other.

The second ratchet cover 1290 has a first end coupled to the hub body 1230 and a second end covering the outside of the second ratchet 1220.

Specifically, the second ratchet cover 1290 has the first end coupled to a partial outer surface of the ratchet accommodating portion 1233 extended toward the second ratchet, and the second end covering a partial outside of a remaining portion of the second ratchet not accommodated in the ratchet accommodating portion 1233.

The second ball bearing 1330 is provided between the inner surface of the second ratchet cover 1290 and a partial outer surface of the remaining portion.

The second ball bearing 1330 serves to allow the second ratchet cover 1290 and the second ratchet 1220 to rotate independently of each other.

Since the second ratchet cover 1290 is coupled to the ratchet accommodating portion 1233, i.e., the hub body 1230, the second ratchet cover 1290 rotates when the hub body 1230 rotates.

Here, when the hub body 1230 is rotated by an external force, the second ratchet cover 1290 is rotated, whereas the second ratchet 1220 is maintained stationary due to the presence of the second ball bearing 1330.

Consequently, the first ratchet 1210 and the second ratchet 1220 are partially accommodated in the hub body 1230; the connection bearing 1340 is interposed between the first ratchet 1210 and the second ratchet 1220; and the first ratchet cover 1190 and the second ratchet cover 1290 are provided to respectively cover the partial outer surfaces of the first ratchet 1210 and the second ratchet 1220, so that the double ratchet can have a compact structure and be stably protected.

Meanwhile, the first lower bracket cup 1180 is arranged to be spaced apart at a predetermined distance from the outer surface of the first ratchet cover 1190, and inserted in and coupled to the inner surface of the first extended portion 1117.

The first lower bracket cup 1180 is formed with a thread on the outer surface thereof, and thus firmly coupled to the first extended portion 1117 as it is fastened toward the hub body 1230.

Tool grooves are formed at regular intervals in a left end of the first lower bracket cup 1180, in which a corresponding projection of a fastening tool for fastening the first lower bracket cup 1180 to the first extended portion 1117 is inserted.

The first cover bearing 1170 is interposed between the outer surface of the first ratchet cover 1190 and the inner surface of the first lower bracket cup 1180 so that the first ratchet cover 1190 can freely rotate with regard to the first lower bracket cup 1180.

On the outer surface of the first ratchet cover 1190 may be formed an annular groove in which the first cover bearing 1170 is seated.

The cover nut 1160 is coupled to the first end of the first ratchet cover 1190 so as to prevent the first cover bearing 1170 from separating from the outer surface of the first ratchet cover 1190.

Consequently, the first ratchet cover 1190 rotates independently of first ratchet 1210 and the lower gear 1140 as being stably supported in the frame hub 1110.

The second lower bracket cup 1260 is inserted in and coupled to the inner surface of the second extended portion 1111.

Tool grooves are formed at regular intervals in a left end of the second lower bracket cup 1260, in which a corresponding projection of a fastening tool for fastening the second lower bracket cup 1260 to the second extended portion 1111 is inserted.

The second cover bearing 1250 is interposed between the outer surface of the spindle 1120 and the inner surface of the second lower bracket cup 1260 so that the spindle 1120 can freely rotate with regard to the second lower bracket cup 1260.

Meanwhile, the spindle 1120 has a first end coupled to the first pedal crank 1270 by the coupling bolt 1280, and a second end coupled to the second pedal crank 1310 by the cap nut 1320.

Here, the spindle 1120 is coupled to the second pedal crank 1310 via the second cover bearing 1250, the internal bearing 1130, the first ratchet 1210, and the second ratchet 1220.

At this time, the spindle 1120 is allowed by the second cover bearing 1250 to rotate with respect to the second lower bracket cup 1260, and allowed by the internal bearing 1130 to rotate independently of the lower gear 1140 and the first ratchet 1210.

On the other hand, the spindle 1120 is coupled to the first pedal crank 1270, the second ratchet 1220 and the second pedal crank 1310 and rotates along with them.

Below, it will be described that the handle power generated in the crank handle 130 is transferred to the chain ring 1240 in the case that a rider operates only the crank handle 130 while riding the hand-foot compound bicycle.

First, when a rider rotates the crank handle 130, the torque of the crank handle 130 is transferred to the handle shaft 113 and the torque of the handle shaft 113 is transferred to the upper gear 121.

The torque of the upper gear 121 is transferred to the first power transfer gear 210, and the torque of the first power transfer gear 210 is transferred to the second power transfer gear 280 via the first power transfer member 220, the second power transfer member 240, the third power transfer member 260 and the fourth power transfer member 270.

The torque of the second power transfer gear 280 is transferred to the lower gear 1140; the torque of the lower gear 1140 is transferred to the first ratchet 1210; the torque of the first ratchet is transferred to the hub body 1230; and the torque of the hub body 1230 is transferred to the chain ring 1240.

At this time, both the first ratchet 1210 and the second ratchet 1220 are partially accommodated in the hub body 1230, but the first ratchet 1210 and the second ratchet 1220 are driven independently of each other, thereby maintaining the second ratchet 1220 stationary.

Since the second ratchet 1220 is stationary, the spindle 1120 connected to the second ratchet 1220 is stationary and thus the first pedal crank 1270 and the second pedal crank 1310 are also stationary without rotating.

If the hub body 1230 rotates, the first ratchet cover 1190 and the second ratchet cover 1290 are also rotated together and at the same time the first ratchet 1210 is rotated, where as the second ratchet is stationary.

On the other hand, it will be described below that the pedal power generated in the pedal 1360 is transferred to the chain ring 1240 in the case that a rider operates only the pedal 1360 while riding the hand-foot compound bicycle.

First, when a rider rotates the first pedal crank 1270 and the second pedal crank 1310, the torque of the first pedal crank 1270 and the torque of the second pedal crank 1310 are transferred to the spindle 1120, the torque of the spindle 1120 is transferred to the second ratchet 1220, the torque of the second ratchet 1220 is transferred to the hub body 1230, and the torque of the hub body 1230 is transferred to the chain ring 1240 via the spider (not shown).

At this time, the spindle 1120 is rotated by the internal bearing 1130 independently of the lower gear 1140, and the first ratchet 1210 is stationary since the first ratchet 1210 and the second ratchet 1220 are driven independently of each other.

Of course, if both the crank handle 130 and the pedal 1360 are driven, both the handle power and the pedal power are transferred to the chain ring.

Here, If the rotating speed of the first ratchet 1210 transferred to the hub body 1230 by the rotation of the crank handle 130 is different from the rotating speed of the second ratchet 1220 transferred to the hub body 1230 by the rotation of the pedal 1360, the hub body 1230 is rotated by faster one between the first ratchet 1210 and the second ratchet 1220. At this time, slower one slides on the inner surface of the hub body 1230 while rotating.

Consequently, both or either one of the first ratchet 1210 and the second ratchet 1220 for respectively transfer the handle power and the pedal power can be selectively coupled to the hub body 1230 as being partially accommodated in the hub body 1230, and thus rotate the hub body 1230 in one direction and stably transferring the handle power and the pedal power to the rear wheel 420.

According to an exemplary embodiment, the hand-foot compound bicycle with the double ratchet has the following effects.

First, both or either one of the first ratchet and the second ratchet for respectively transferring the handle power and the pedal power can be selectively coupled to the hub body as being accommodated in the hub body and thus rotate the hub body in one direction, thereby stably transferring the handle power and the pedal power to the rear wheel.

Second, the connection bearing is provided between the first ratchet and the second ratchet so that the first ratchet and the second ratchet can rotate independently, and the first ratchet cover and the second ratchet cover are provided to cover the partial outer surfaces of the first ratchet and the second ratchet, thereby achieving a compact structure of the double ratchet and stably protecting the double ratchet.

Third, the spindle penetrating the second power transfer gear, the lower gear and the lower gear is placed inside the frame hub connected to the lower frame and the middle frame, in which the bearings for allowing the lower gear to freely rotate within the stationary frame hub so that the spindle and the lower gear can stably rotate independently of each other, and the first lower bracket cup, the second lower bracket cup, the first cover bearing and the second cover bearing are efficiently arranged for supporting the spindle and the lower gear within the frame hub, thereby transferring the power through a stable structure.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A hand-foot compound bicycle with a double ratchet, comprising:
    a handle assembly which comprises a crank handle for generating handle power, and an upper gear to be rotated by rotation of the crank handle;
    a pedal assembly which comprises a pedal for generating pedal power, and transfers both or either one of the handle power and the pedal power to a rear wheel; and
    a power transfer unit which comprises a first power transfer gear corresponding to the upper gear, and a second power transfer gear for transferring the handle power from the first power transfer gear to the pedal assembly,
    the pedal assembly comprising: a frame hub, a lower gear placed inside the frame hub and rotating corresponding to the second power transfer gear, a first ratchet engaged with the lower gear and rotating, a spindle penetrating the lower gear and the first ratchet and rotating independently of the lower gear and the first ratchet, first and second pedal cranks coupled to opposite ends of the spindle, a second ratchet coupled to the spindle and rotating, a hub body coupled to both or either one of the first ratchet and the second ratchet while partially accommodating both the first ratchet and the second ratchet and rotating in one direction, and a chain ring coupled to the hub body and transmitting power to the rear wheel, and
    the first ratchet comprising: a first ratchet body, and a first ratchet gear provided on an outer circumference of the first ratchet body, in which the first ratchet gear rotates the hub body in one direction while engaging with a gear engaging groove formed in the hub body when the lower gear rotates.

2. The hand-foot compound bicycle with the double ratchet according to claim 1, wherein the pedal assembly further comprises a connection bearing interposed between the first ratchet and the second ratchet and allowing the first ratchet and the second ratchet to rotate independently of each other.

3. The hand-foot compound bicycle with the double ratchet according to claim 1, wherein the pedal assembly further comprises a first ratchet cover having a first end coupled to the hub body and a second end partially covering an outer surface of the first ratchet, and a second ratchet cover having a first end coupled to the hub body and a second end partially covering an outer surface of the second ratchet.

4. The hand-foot compound bicycle with the double ratchet according to claim 3, wherein the pedal assembly further comprises a first ball bearing interposed between the first ratchet cover and the first ratchet and allowing the first ratchet cover and the first ratchet to rotate independently of each other, and a second ball bearing interposed between the second ratchet cover and the second ratchet and allowing the second ratchet cover and the second ratchet to rotate independently of each other.

5. The hand-foot compound bicycle with the double ratchet according to claim 4, wherein the pedal assembly comprises an internal bearing interposed between an outer surface of the spindle and an inner surface of the lower gear and allowing the spindle and the lower gear to rotate independently of each other, and an external bearing interposed between an outer surface of the lower gear and an inner surface of the first ratchet cover and allowing the first ratchet cover and the lower gear to rotate independently of each other.

6. The hand-foot compound bicycle with the double ratchet according to claim 3, wherein the frame hub comprises a first connecting portion coupling with a lower frame in which a lower region of the power transfer unit is provided, a second connecting portion coupling with a middle frame connected to a saddle, a first extended portion extended toward the first ratchet, and a second extended portion extended in an opposite direction to the first extended portion.

7. The hand-foot compound bicycle with the double ratchet according to claim 6, wherein the pedal assembly further comprises a first lower bracket cup inserted in and coupled to an inner surface of the first extended portion while being spaced at a certain distance from an outer surface of the first ratchet cover, and a second lower bracket cup inserted in and coupled to an inner surface of the second extended portion.

8. The hand-foot compound bicycle with the double ratchet according to claim 7, wherein the pedal assembly further comprises a first cover bearing interposed between an outer surface of the first ratchet cover and an inner surface of the first lower bracket cup so that the first ratchet cover can freely rotate with respect to the first lower bracket cup, and a second cover bearing interposed between an outer surface of the spindle and an inner surface of the second lower bracket cup so that the spindle can freely rotate with respect to the second lower bracket cup.

9. The hand-foot compound bicycle with the double ratchet according to claim 8, wherein the pedal assembly further comprises a cover nut coupled to the first end of the first ratchet cover and preventing the first cover bearing from separating from the outer surface of the first ratchet cover.

10. The hand-foot compound bicycle with the double ratchet according to claim 1, wherein the second ratchet comprises a second ratchet body, and a second ratchet gear provided on an outer circumference of the second ratchet body, in which the second ratchet gear rotates the hub body in one direction while engaging with the gear engaging groove when the spindle rotates.

* * * * *